United States Patent [19]
Fukami

[11] Patent Number: 5,929,346
[45] Date of Patent: Jul. 27, 1999

[54] APPARATUS FOR DETECTING ABNORMALITIES IN A WORK HOLDER

[75] Inventor: Yasuhiko Fukami, Aichi, Japan

[73] Assignee: Murata Kikai Kabushiki Kaisha, Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/951,743

[22] Filed: Oct. 16, 1997

Related U.S. Application Data

[63] Continuation of application No. 08/708,826, Sep. 9, 1996, abandoned.

[30] Foreign Application Priority Data

Sep. 11, 1995 [JP] Japan ................................... 7-232144

[51] Int. Cl.$^6$ ...................................................... G01L 1/00
[52] U.S. Cl. ...................................................... 73/862.541
[58] Field of Search ........................ 73/862.541, 862.542

[56] References Cited

U.S. PATENT DOCUMENTS

| 4,294,320 | 10/1981 | Bilstad et al. ........................ 177/165 |
| 4,549,425 | 10/1985 | Wisebaker et al. . |
| 4,603,395 | 7/1986 | Steinberger . |
| 4,653,793 | 3/1987 | Guinot et al. . |
| 5,142,769 | 9/1992 | Gold et al. . |
| 5,467,656 | 11/1995 | Teare et al. . |
| 5,523,662 | 6/1996 | Goldenberg et al. .............. 318/568.11 |

*Primary Examiner*—Robert Raevis
*Attorney, Agent, or Firm*—Armstrong, Westerman, Hattori, McLeland & Naughton

[57] ABSTRACT

An apparatus that improves safety by detecting work gripping abnormalities in a work holder. A rod 21a of an air cylinder 21 vertically moves and a work holder 34 opens and closes by the movement of the upper movable gripping arm 34a using the rotation point 34c as a fulcrum. A strain gauge 4 is affixed to the upper surface of the upper movable gripping arm 34a. The detection results of this strain gauge 4 are sent to a determination device 2 via a strain amplifier 3. When this detection result exceeds an abnormal level, the determination device 2 determines a work gripping abnormality and transmits a work holder abnormality signal to an NC device 1. When the NC device 1 receives an abnormality signal, is quickly carries out processes which stop the machine.

2 Claims, 2 Drawing Sheets

FIG.I

APPARATUS FOR DETECTING ABNORMALITIES IN A WORK HOLDER

This application is Continuation of application Ser. No. 08/708,826 filed Sep. 9, 1996, now abandoned.

BACKGROUND OF THE INVENTION

1. Field of the Invention

The present invention relates to an abnormality detection apparatus of a work holder that grips a flat work in a punch press machine or a shearing machine or the like.

2. Background Art

On a sheet metal processing machine such as a punch press or the like, the edge of work loaded on a table is gripped by a work holder and processing is carried out by positioning the process position of the gripped work in the process part of the machine by moving the work holder along X and Y axes.

In this way, the process position of the work is delivered to the process part by movement of the work in the X and Y axes but for a number of reasons, the work may separate from the work holder. If this occurs, exact processing can not be carried out on the work and the work itself may fly off the table thus representing a danger to the operator. Likewise the problem of machine durability may arise with damage to other parts of the machine.

Conventionally, mechanisms preventing separation of the work had been devised but in the following cases, the possibility of work separation remained:

1) When large scale work (heavy work) is moved at high speed, the inertia of the work increases and the gripping force of the work holder is unable to counteract the work inertia.
2) Whenever the punch tool catches in the work while processing and the work holder is moved in that state.
3) In particular, in the processing of thin work, whenever the connector part (called the microjoint) that connects the product work formed from the punch process and the material work catches on the ball member of the table or another part and the work holder is moved in that state.

SUMMARY OF THE INVENTION

It is an object of the present invention to propose an apparatus for detecting abnormalities in a work holder that is normally able to observe work holder abnormalities such as a work separation state or a state where work separation is likely to occur and when an abnormality occurs, that can quickly stop the machine.

In order to achieve the above object, the present invention is an abnormality detection device of a work holder that grips the work and is arranged with a means for detecting strains in the work holder and an abnormality determination means for determining gripping abnormalities of the work holder based on the detected strain state of the work holder.

Further, a means for controlling the movement of the work holder is arranged and the abnormality determination means sends a work holder abnormality information to the means for controlling the movement of the work holder when a gripping abnormality of the work holder is determined.

Yet further, the means for detecting strain is affixed to a part other than the work gripping part of the work holder.

Yet further still, when the work holder is gripping and moving the work, the abnormal determination means transmits work holder abnormality information when the detected strain state of the work holder nears the strain state when the work separates.

Further, when the work holder is gripping and moving the work, the abnormal determination means transmits work holder abnormality information when the detected strain state of the work holder is recognised to have become the strain state when the work separates.

DETAILED DESCRIPTION OF THE EMBODIMENT

An embodiment of the present invention will be described based on FIGS. 1 to 3.

Figure 3:
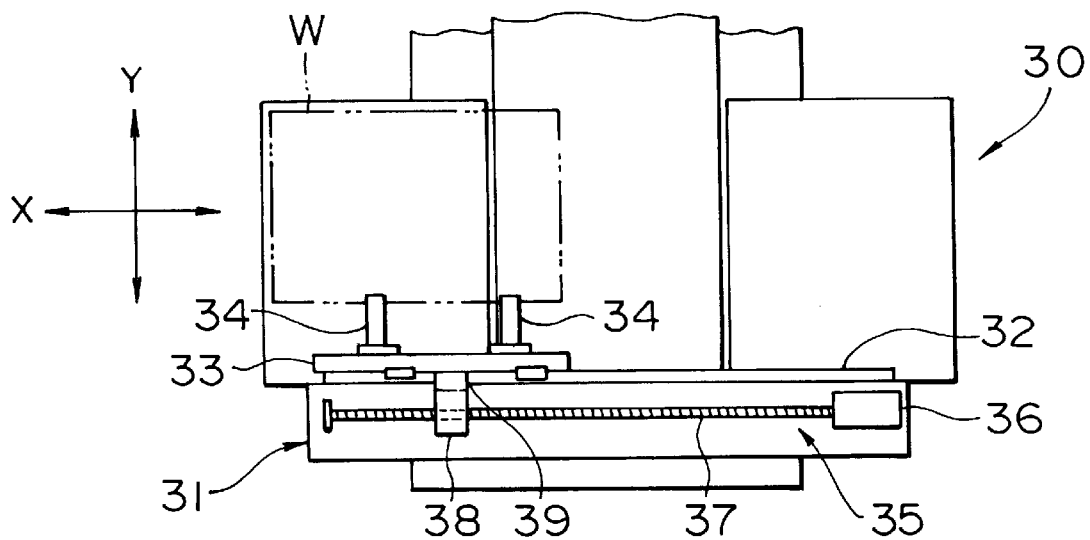
FIG. 3 is plan view showing the work delivery part of the present invention.

As shown in FIG. 3, a cross slide guide rail 32 extending to the left and right (direction of the X axis) is arranged on the front of a carriage 31 that advances and retracts in front of and behind a table 30 (direction of the Y axis). A plurality of work holders 34 that grip the work W on the table 30 are attached to a cross slide 33 positioned on that rail 32 so that it moves freely to the left and right.

The cross slide 33 is moved to the left and right by a retraction drive device 35 arranged on the carriage 31. This retraction drive device 35 has a screw member 37 that is rotated by a motor 36 and a ball nut 38 that is attached to that screw member 37, and the ball nut 38 is connected to the cross slide 33 via a connector member 39.

Figure 1:
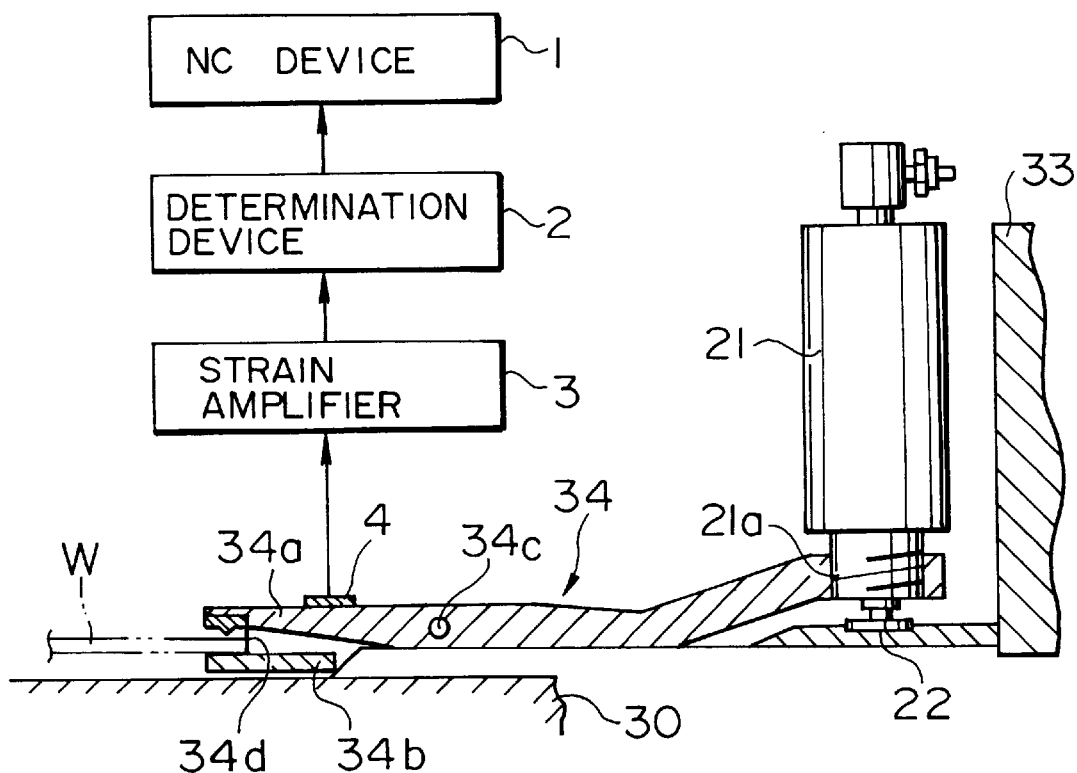
FIG. 1 is a cross section of the work holder and a block diagram showing that abnormality detection device of the present invention.
Figure 2:
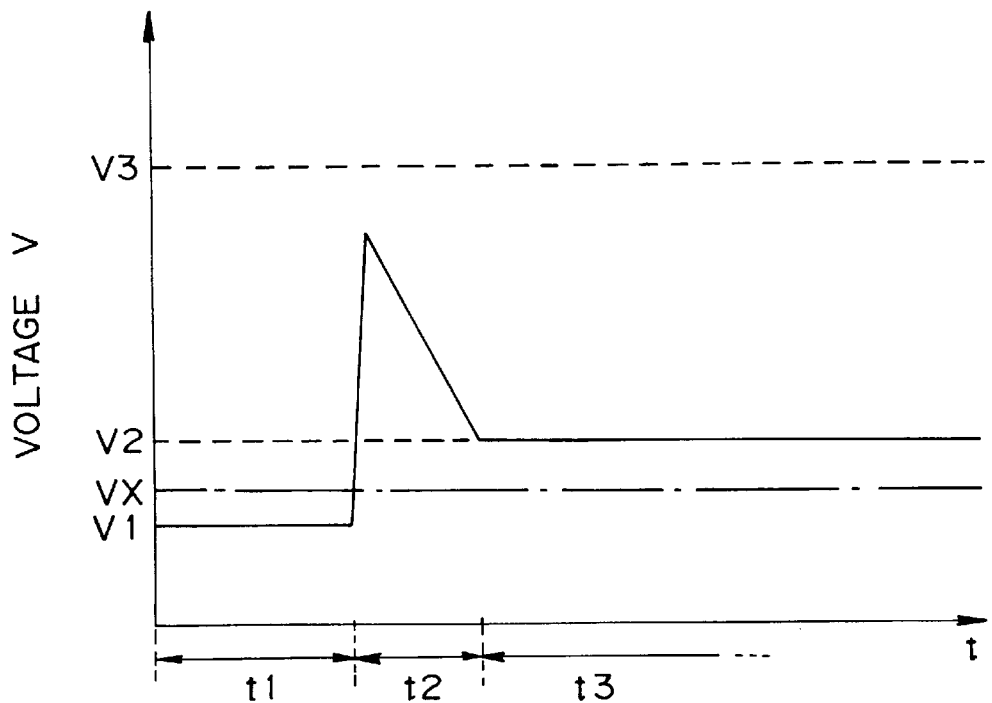
FIG. 2 is a graph of voltage V showing the detection level of the strain gauge against time t.

The work holder 34 shown in FIG. 1 is arranged with an upper movable gripping arm 34a that is attached so that it can freely rotate about the fulcrum 34c to open and close with respect to a lower fixed gripping arm 34b.

A rod end 21a of an air cylinder 21 is attached to the rear (right in FIG. 1) of the upper movable gripping arm 34a and the upper movable gripping arm 34a rotates open and closed about the fulcrum 34c due to the vertical movement of this rod 21a. In short, the work holder 34 opens when the rod 21a (the rear part of the upper movable gripping arm 34a) is in the lowered position (the state shown in FIG. 1) where it contacts a stopper 22, and in reverse, closes and is able to grip the work W when in the elevated position.

Under normal conditions, the work W is gripped in a state where the work edge surface is touching a throat part 34d of the work holder 34 but when re-gripping operations by the work holder 34 are required when a large scale work larger than the machine size is to be processed, the work W is gripped in a state where it is slightly separated (i.e. not touching) from the throat part 34d. In the case of re-gripping operations, if the work W is in contact with the throat part 34d, it may be pushed by the work holder 34 due to lack of support and be positioned mistakenly.

A strain gauge 4 that detects strains of the upper movable gripping arm 34a is affixed to the upper movable gripping arm 34a. In order to process the detection results from this strain gauge 4, a strain amplifier 3, determination device 2 and NC device 1 are arranged. The strain amplifier 3 takes in the detection result (voltage) of the strain gauge 4, amplifies this data and transmits it to the determination device 2. The determination device 2 detects abnormalities of the work holder 34 by the data received from the strain amplifier 3. When a determination that there is abnormalities is produced, a work holder abnormality signal is transmitted to the NC device 1. The NC device 1 carries out processing which quickly stops the machine when this work holder abnormality signal is received. In reality, the delivery of the work in the X and Y axes of the work delivery part is stopped and if a punch drive system is in operation this is naturally stopped as well.

The strain gauge 4 is affixed when the work holder 34 is in an open state and is compressed when the work holder 34 moves to a closed state.

The determination device 2 detects gripping abnormalities of the work holder 34. The graph shown in FIG. 2 shows the voltage V of the detection result (amplifies data) of the strain gauge 4 against time t. The voltage level shown at V3 is the voltage when the work holder 34 is in the normal state being an open state.

From this state, when the upper movable gripping arm 34a is moved and the work W is gripped, the strain gauge 4 becomes compressed and the voltage drops to level V1 during time t1. If this level V1 is detected, the work holder 34 is determined to be without abnormality and processing is carried out on the work W.

If, for some reason, the work W attempts to become separated from the work holder 34, the output voltage greatly changes over the first half of the time period t2 from level V1 to V3 as shown in the second time period t2. This is due to the work separation actions functioning in a direction that releases the compressed state of the strain gauge 4. Afterwards, the voltage gradually decreases again and when the work W has completely separated from the work holder 34, the voltage reaches level V2. In this level V2 (time period t3), the work W is not gripped but as the force is being applied by the air cylinder 21, the work W is in an open gripped state and the level is higher than level V1.

Between these levels V1 and V2, an abnormal level VX is set. The determination device 2 emits a determination that there is an abnormality in the work holder 34 when the voltage from the strain gauge 4 exceeds the set abnormal level VX. In short, abnormal level VX is set in order to detect the movement of the work holder 34 from level V1 indicating the state of the work holder 34 when it is gripping the work (normal state) to level V2 indicating a state where the work W has separated (abnormal state).

The abnormalities of the work holder 34 described here indicate states where the work W has completely separated or where the possibility of separation is great. At the abnormal level VX shown in FIG. 2, as abnormalities can be detected at time t2 when the work W has not completely separated from the work holder 34, the machine can be stopped before the work W completely separates.

Of course, it is possible to change the setting of abnormal level VX according to necessity. For example, it is possible to reliably prevent mistaken abnormality detection and reduce as much as possible machine stoppage by setting abnormal level VX higher than level V2. Even in this case, the machine can be stopped before the work W completely separates.

Furthermore, due to the possibility of changing the setting of the abnormal level VX according to necessity, the present invention can be applied to various machines and work holders.

As the strain gauge 4 is affixed to the upper surface of the upper movable gripping arm 34a being a place not directly related to the gripping operations of the gripping part of the work holder 34, abnormalities of the work holder 34 can be detected at any time. In short, in contrast to the impossibility of abnormality detection during re-gripping operations of the work holder 34 if the sensor that detects the gripping of the work W is affixed to the throat part 34d of the holder 34, as described above, there are no such problems on the present construction. Also, by attaching it to the upper surface of the upper movable gripping arm 34a, the wiring from the strain gauge remains uncomplicated.

Furthermore, because only the strain gauge 4 is affixed, the construction is simple compared to when a touch sensor or an air sensor is attached to the throat part 34d. Due to the mechanism for setting the above described abnormal level VX, prediction of work holder abnormalities is possible.

It should be stated that the detection result of the strain gauge 4 need not be limited to a voltage level but detection of a level setting may be carried out using a current value. Furthermore, the strain gauge 4 need not be limited to attachment in a open state of the work holder 34, but may be attached in a closed state. In this case, when the work holder 34 moves to an open state, the strain gauge 4 is extended.

The present invention demonstrates the following effects.

The strain of the work holder is detected and as there is determination of gripping abnormalities of the work holder, reliable abnormality detection is possible due to the physical changes in the work holder.

When the abnormal determination means determines an abnormal gripping of the work holder, work holder abnormality information is transmitted to a means for controlling the movement of the work holder thus it is possible to quickly stop the machine and increase safety.

As the means for detecting strains is affixed to a part other than the work gripping part of the work holder, gripping abnormalities of the work holder can be observed at any time. For example, detection of gripping abnormalities after re-gripping operations of the work holder 34 which was conventionally impossible can be carried out.

When the work holder is gripping and moving the work, as the abnormal determination means transmits work holder abnormality information when the detected strain state of the work holder nears the strain state when the work separates, gripping abnormalities can be quickly detected and it is possible to stop the machine before complete work separation occurs thus increasing safety.

When the work holder is gripping and moving the work, as the abnormal determination means transmits work holder abnormality information when the detected strain state of the work holder is recognised to have become the strain state when the work separates, mistaken determination of gripping abnormalities can be prevented.

What is claimed is:

1. An apparatus for detecting abnormalities in a work holder which grips work, the holder including only two grip arms, the apparatus comprising:

a means for directly detecting strains of at least one of the grip arms, the at least one grip arm directly abutting the work, wherein said strain detecting means comprises strain amplifying means for amplifying strain data;

an abnormality determination means for receiving amplified strain data from said strain amplifying means and for determining gripping abnormities of the work holder based on the detected strain state of the work holder, wherein a means for controlling the movement of the work holder is arranged and the abnormality determination means transmits work holder abnormality information to the means for controlling the movement of the work holder when a gripping abnormality of the work holder is determined, wherein, when the work holder is gripping and moving the work, the abnormal determination means transmits work holder abnormality information when the detected strain state of the work holder nears the strain state when the work is abnormal; and means for setting a set strain level, when the work is about to separate from the work holder, between a normal state level and an abnormal state level, the normal state level being a state level when the work holder normally grips the work, and the abnormal state level being a state level when the work has separated from the work holder, wherein the abnormality determination means transmits the work holder abnormality information when a detected strain of the work holder becomes the set strain level.

2. An apparatus for detecting abnormalities in a work holder as in claim 1, wherein the means for detecting a strain is affixed to a part other than a work gripping part of the work holder.

* * * * *